(12) United States Patent
Ono et al.

(10) Patent No.: US 10,640,061 B2
(45) Date of Patent: May 5, 2020

(54) MAINTENANCE NOTIFICATION APPARATUS

(71) Applicant: Mitsubishi Electric Corporation, Tokyo (JP)

(72) Inventors: Hiroyuki Ono, Tokyo (JP); Hiroshi Aizawa, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/219,106

(22) Filed: Dec. 13, 2018

(65) Prior Publication Data

US 2019/0111870 A1 Apr. 18, 2019

Related U.S. Application Data

(63) Continuation of application No. 15/251,160, filed on Aug. 30, 2016, now abandoned.

(30) Foreign Application Priority Data

Apr. 22, 2016 (JP) .................................. 2016-085780

(51) Int. Cl.
- *B60R 16/023* (2006.01)
- *G07C 5/00* (2006.01)
- *G07C 5/08* (2006.01)

(52) U.S. Cl.
CPC .......... *B60R 16/0234* (2013.01); *G07C 5/006* (2013.01); *G07C 5/085* (2013.01); *G07C 5/0825* (2013.01)

(58) Field of Classification Search
None
See application file for complete search history.

(56) References Cited

U.S. PATENT DOCUMENTS

| 4,525,782 A * | 6/1985 | Wohlfarth | G07C 5/085 340/457.4 |
| 4,551,703 A * | 11/1985 | Bourauel | B60Q 9/00 340/309.7 |

(Continued)

FOREIGN PATENT DOCUMENTS

| JP | 62-94443 A | 4/1987 |
| JP | 9-229693 A | 9/1997 |

(Continued)

OTHER PUBLICATIONS

Communication dated Feb. 28, 2017 from the Japanese Patent Office in counterpart Japanese application No. 2016-085780.

(Continued)

*Primary Examiner* — Navid Ziaeianmehdizadeh
(74) *Attorney, Agent, or Firm* — Sughrue Mion, PLLC; Richard C. Turner

(57) ABSTRACT

Even in the case where a vehicle is not utilized for a long period of time, not only maintenance notification but notification of countermeasures is performed by use of vehicle information. There is provided a control unit that: calculates a maintenance timing based on vehicle information obtained by a vehicle information I/F, a present time measured by a time measurement unit, and maintenance information stored in a memory unit; detects that the maintenance timing for the vehicle part has arrived, from the result of a failure determination based on the vehicle information, a stoppage period during which the vehicle is turned off, a usage period of the vehicle part between the usage-start time and the present time, and mileage of the vehicle or an engine driving time; and controls a display unit to notify the user of the arrival of the maintenance timing and a maintenance method.

6 Claims, 14 Drawing Sheets

(56) References Cited

U.S. PATENT DOCUMENTS

| | | | | |
|---|---|---|---|---|
| 4,884,054 A * | 11/1989 | Moon, Sr. | ............ | B60R 16/0234 340/457.4 |
| 6,141,629 A * | 10/2000 | Yamamoto | .............. | E02F 9/205 340/309.7 |
| 6,294,988 B1 | 9/2001 | Shomura | | |
| 6,308,120 B1 * | 10/2001 | Good | ........................ | G08G 1/20 340/438 |
| 6,609,051 B2 * | 8/2003 | Fiechter | .............. | G06F 11/2263 700/31 |
| 7,542,833 B2 * | 6/2009 | Kelly | .................. | G01M 17/007 340/457.4 |
| 7,706,938 B2 * | 4/2010 | Palladino | ............... | B60W 50/14 340/438 |
| 9,466,153 B2 * | 10/2016 | Fischer | .................. | G07C 5/008 |
| 2002/0073012 A1 * | 6/2002 | Lowell | ................ | G06Q 30/0601 705/37 |
| 2002/0080022 A1 * | 6/2002 | Edwards | ................ | G07C 5/006 340/457 |
| 2002/0880022 | 6/2002 | Edwards | | |
| 2004/0249531 A1 * | 12/2004 | Kelly | .................. | G01M 17/007 701/29.4 |
| 2005/0015186 A1 * | 1/2005 | Kelly | ..................... | G07C 5/008 701/31.4 |
| 2005/0033527 A1 | 2/2005 | Wada et al. | | |
| 2005/0080525 A1 * | 4/2005 | Hoeflacher | ......... | B60R 16/0234 701/29.4 |
| 2006/0217935 A1 * | 9/2006 | Beiermeister | ....... | G06F 11/0739 702/188 |
| 2007/0021884 A1 * | 1/2007 | Chen | ...................... | G07C 5/006 701/29.5 |
| 2009/0099720 A1 * | 4/2009 | Elgali | .................... | G06Q 10/06 701/31.4 |
| 2010/0174443 A1 * | 7/2010 | Kubota | .................. | G07C 5/006 701/29.5 |
| 2011/0302092 A1 * | 12/2011 | Basir | ...................... | G06Q 10/20 705/305 |
| 2014/0100738 A1 * | 4/2014 | Itatsu | .................. | G07C 5/0808 701/33.4 |
| 2014/0310186 A1 * | 10/2014 | Ricci | ....................... | H04W 4/21 705/302 |

FOREIGN PATENT DOCUMENTS

| | | |
|---|---|---|
| JP | 11-311149 A | 11/1999 |
| JP | 2003-40090 A | 2/2003 |
| JP | 2005-275903 A | 10/2005 |
| JP | 2008-015718 A | 1/2008 |
| JP | 2008-257582 A | 10/2008 |
| JP | 2011-51372 A | 3/2011 |
| JP | 2011-111977 A | 6/2011 |
| WO | 02066933 A1 | 8/2002 |
| WO | 2008152836 A1 | 12/2008 |

OTHER PUBLICATIONS

Communication dated Aug. 29, 2017 from the Japanese Patent Office in counterpart application No. 2016-085780.

* cited by examiner

FIG. 5

| PARTS | ACTUAL USAGE | | MAINTENANCE | | REPLACEMENT | |
|---|---|---|---|---|---|---|
| | STARTING MILEAGE | STARTING DATE | MILEAGE | DATE/TIME | MILEAGE | DATE/TIME |
| ENGINE OIL | 18200km | 2015/12/10 | 22200km | 2016/4/10 | 23200km | 2016/6/10 |
| TRANSMISSION OIL | 0km | 2012/12/8 | 15000km | FFFFFFFF | 20000km | FFFFFFFF |
| FUEL ELEMENT | 0km | 2012/12/8 | 60000km | FFFFFFFF | 80000km | FFFFFFFF |
| COOLANT | 0km | 2015/1/10 | FFFF | 2016/7/10 | FFFF | 2017/1/10 |
| ... | | | | | | |

FIG. 8

| No. | STOPPAGE DATE | STOPPAGE PERIOD (DAYS) | HR.: MIN. |
|---|---|---|---|
| 1 | 2016/1/20 (WEDNESDAY) | 0 | 0:40 |
| 2 | 2016/1/8 (FRIDAY) | 11 | 20:45 |
| 3 | 2016/1/8 (FRIDAY) | 0 | 3:01 |
| 4 | 2016/1/8 (FRIDAY) | 0 | 0:20 |
| 5 | 2015/12/28 (MONDAY) | 10 | 18:54 |
| 6 | 2015/12/28 (MONDAY) | 0 | 0:40 |
| 7 | 2015/12/27 (SUNDAY) | 0 | 21:05 |
| 8 | 2015/12/25 (FRIDAY) | 1 | 22:39 |
| 9 | 2015/12/25 (FRIDAY) | 0 | 0:58 |
| 10 | 2015/12/20 (SUNDAY) | 5 | 5:34 |
| 11 | 2015/12/20 (SUNDAY) | 0 | 3:18 |
| ... | | | |
| 30 | 2015/12/1 (TUESDAY) | 1 | 0:05 |

FIG. 10

| PARTS | ACTUAL USAGE | | MAINTENANCE | | REPLACEMENT | |
|---|---|---|---|---|---|---|
| | MILEAGE | STARTING DATE | MILEAGE (RELATIVE) | INTERVAL | MILEAGE (RELATIVE) | INTERVAL |
| ENGINE OIL | 300km | 2015/12/10 | 4000km | 4 MONTHS | 5000km | 6 MONTHS |
| TRANSMISSION OIL | 18500km | 2012/12/8 | 15000km | FFFF | 20000km | FFFF |
| FUEL ELEMENT | 18500km | 2012/12/8 | 60000km | FFFF | 80000km | FFFF |
| COOLANT | 18500km | 2015/1/10 | FFFF | 18 MONTHS | FFFF | 24 MONTHS |
| ... | | | | | | |

FIG. 11

| PHENOMENA | CHECK ITEMS | CHECKING METHODS | LINK |
|---|---|---|---|
| MOTORCYCLE DOES NOT RUN STRAIGHTLY | TIRE AIR PRESSURE | (i) ASCERTAIN SPECIFIED AIR PRESSURE WITH REFERENCE TO VEHICLE-BODY DESCRIPTION OR MANUAL ... | MANUAL |
| | TIRE ABRASION | ... | ... |
| | FRONT-FORK DISTORTION | ... | ... |
| | STEM BEARING EXHAUSTION | ... | ... |
| ... | | | |

MAINTENANCE NOTIFICATION APPARATUS

This is a continuation application of U.S. patent application Ser. No. 15/251,160, filed Aug. 30, 2016, in the U.S. Patent and Trademark Office, which claims priority to Japanese Patent Application No. 2016-085780, filed on Apr. 22, 2016 in the Japanese Intellectual Property Office, the disclosures of which are incorporated herein by reference in their entirety.

BACKGROUND OF THE INVENTION

Field of the Invention

The present invention relates to a maintenance notification apparatus that provides maintenance information to a user and particularly to a maintenance notification apparatus that supports vehicle maintenance in which replacement, adjustment, maintenance, inspection, or repair of vehicle parts is carried out.

Description of the Related Art

To date, as an apparatus for supporting vehicle maintenance, there has been a maintenance timing notification apparatus, as disclosed, for example, in Japanese Patent Application Laid-Open No. 2003-40090 (Patent Document 1) or Japanese Patent Application Laid-Open No. 2011-51372 (Patent Document 2), that preliminarily stores, in a storage means, data related to the replacement timings and the maintenance timings for vehicle parts, corresponding to the mileage and the usage period of the vehicle, that determines, based on the mileage and the usage period of the vehicle, whether or not the present time is a maintenance timing, and that notifies the user of the fact that the present time is a maintenance timing, when it has been determined that the present time is a maintenance timing.

[Patent Document 1] Japanese Patent Application Laid-Open No. 2003-40090

[Patent Document 2] Japanese Patent Application Laid-Open No. 2011-51372

However, because in a conventional maintenance timing notification apparatus, maintenance at a time when a vehicle is not used for a long time is not taken into consideration, there has been a problem that in the case where the vehicle has not been utilized for a long time, no appropriate maintenance notification can be performed. In a vehicle, there occurs deterioration due to a long non-usage period, in addition to deterioration corresponding to the mileage, the usage period, and the like; therefore, it is desirable that even in the case where the vehicle is not utilized for a long time, maintenance notification is provided to the user. For example, some users utilize trains for daily commutation and travel and utilize automobiles for a long vacation, and some users utilize bikes not for daily travel but as a hobby; in these cases, the vehicles are disused for a long time.

In the case of a bike, in particular, a light two-wheel vehicle and a motorized bicycle prescribed in the Road Transport Vehicle Act do not need to undergo vehicle inspection; therefore, after having been disused for a long time, they can be utilized without undergoing any maintenance check. When not utilized for a long time, the lifetime of a vehicle may be shortened or an accident may be caused. In general, a maintenance check is implemented, for example, every six months; however, when the vehicle has not been utilized at all for a long time, the vehicle should undergo a maintenance check even when the vehicle has not been utilized, for example, only for one month, a shorter period than six months. For example, disuse for a long period of time results in "rust on the brake disc", "adhesion of the clutch plate", "tear and wear of the handwheel", "slacking of the chain", "battery exhaustion", or the like.

Moreover, in the case of a conventional maintenance timing notification apparatus, each time notification is provided, what a user, who is not familiar with a vehicle, can do is just to bring the vehicle to a dealer or the like; when frequently provided, notification may be neglected and becomes just bothersome. Thus, it is preferable that notification is provided not only for informing the maintenance timing but also for informing what kinds of countermeasures should be taken in order to implement maintenance and prolong the lifetimes of the vehicle parts and the vehicle. Furthermore, when a failure can also be notified by use of vehicle information, maintenance information is unified and hence the maintenance timing notification apparatus becomes easy to understand; by use of vehicle information, it is made possible to notify a good and the optimum maintenance method corresponding to the state of the vehicle, in comparison with the case where no vehicle information is utilized.

By providing notification at a time when a vehicle has not been utilized for a long period of time and providing countermeasures that can be understood by a user who is not familiar with the vehicle, it can be expected that the lifetimes of vehicle parts and the vehicle are prolonged, that an accident due to insufficient maintenance is prevented, and that malfunction of the vehicle is found in early stages.

SUMMARY OF THE INVENTION

The present invention is to provide a maintenance notification apparatus that solves the foregoing problems, that provides maintenance notification even in the case where a vehicle is not utilized for a long period of time, by use of not only the mileage and the usage period but also vehicle information, and that provides even notification of countermeasures.

A maintenance notification apparatus according to the present invention supports a user of a vehicle in maintenance of a vehicle part utilized in the vehicle; the maintenance notification apparatus includes a vehicle information interface that obtains vehicle information on the vehicle, a timer that measures a present time, a memory that stores maintenance information on the vehicle, a controller that calculates a maintenance timing based on vehicle information obtained by the vehicle information interface, a present time measured by the timer, and maintenance information stored in the memory, and a display that notifies the user of arrival of the maintenance timing and a maintenance method; the maintenance notification apparatus is characterized in that from the result of a failure determination based on the vehicle information, a stoppage period during which the vehicle stops, a usage period of the vehicle part between the usage-start time and the present time, and mileage of the vehicle or an engine driving time, the controller detects that the maintenance timing for the vehicle part has arrived, and in that based on detection by the control unit, the display unit notifies the user of arrival of a maintenance timing and a maintenance method.

In the maintenance notification apparatus according to the present invention, there are performed maintenance notification for deterioration due to usage, which relates to the mileage and the usage period, and deterioration due to disuse for a long time, and a maintenance method is also notified; therefore, prolongation of the lifetimes of the vehicle parts and the vehicle and prevention of an accident can be expected. Because maintenance notification is performed by use of vehicle information, an optimum maintenance method can be notified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a table representing a usage status list, for each of vehicle parts, that are utilized in the maintenance notification apparatus according to Embodiment 1 of the present invention;

FIG. 8 is a table representing a vehicle engine stoppage time list in the maintenance notification apparatus according to Embodiment 1 of the present invention;

FIG. 10 is a table representing a usage status list, for each of vehicle parts, that are utilized in the maintenance notification apparatus according to an example of the present invention;

FIG. 11 is a table representing a reverse-lookup maintenance list in the maintenance notification apparatus according to Embodiment 1 of the present invention;

DETAILED DESCRIPTION OF THE PREFERRED EMBODIMENTS

Hereinafter, preferred embodiments of a maintenance notification apparatus according to the present invention will be explained in detail with reference to the drawings.

Embodiment 1

Figure 1:
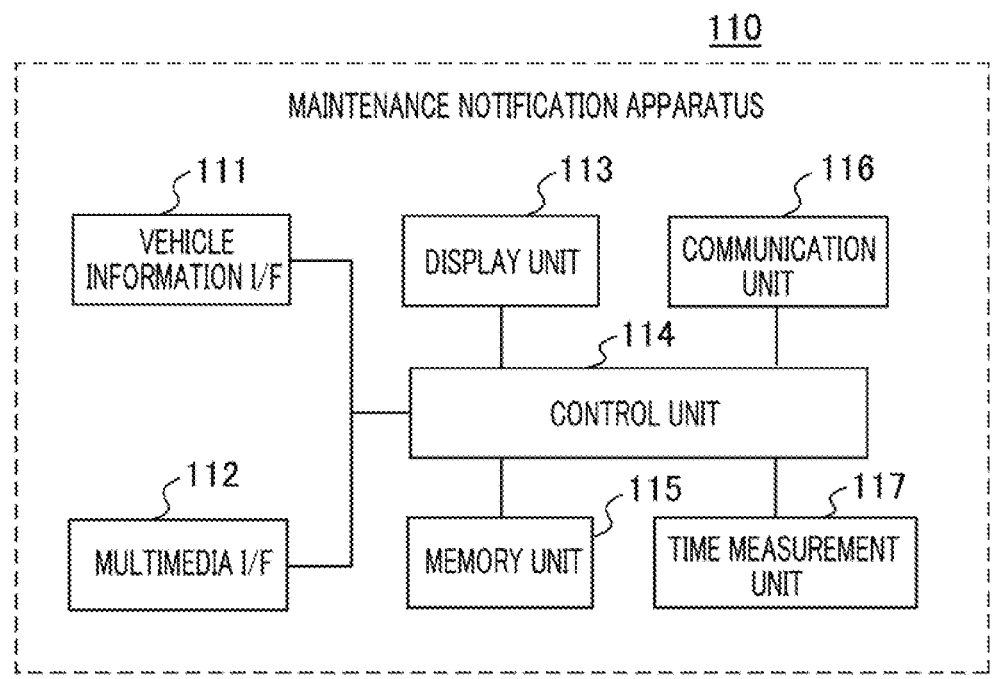
FIG. 1 is a system configuration diagram of a maintenance notification apparatus according to Embodiment 1 of the present invention.

FIG. 1 is a block diagram representing the system configuration of a maintenance notification apparatus according to Embodiment 1 of the present invention. As represented in FIG. 1, a maintenance notification apparatus 110 includes a vehicle information interface (I/F) 111, a multimedia interface (I/F) 112, a display unit 113, a control unit 114, a memory unit 115, a communication unit 116, and a time measurement unit 117.

The vehicle information I/F 111 is formed of an input/output unit for vehicle information items such as a blinker on/off input and a head light on/off input; the multimedia I/F 112 is formed of, for example, a button or a touch panel for operating a maintenance notification apparatus. As the multimedia I/F 112, there may be utilized a USB or Wi-Fi for connecting an electronic device such as a smart phone, Bluetooth (a registered trademark) for connecting a head set or the like, or an SD card for inputting or outputting data. In addition, positional information through the GPS (Global Positioning System) may also be inputted.

The display unit 113 is formed of, for example, a display device such as a color liquid-crystal display for providing information to a user; the control unit 114 is formed of, for example, a control device for a memory storing a program for making a CPU, a ROM, and a RAM, or the maintenance notification apparatus 110, operate. The memory unit 115 is formed of a storage device such as a nonvolatile memory that retains records even when the power source is turned off; the memory unit 115 is, for example, an EEPROM or a flash memory. The memory unit 115 stores various kinds of dates and times related to maintenance notification, mileage, due dates, maintenance methods, and the like.

The communication unit 116 is formed of, for example, a communication apparatus that performs communication of data on the engine rotation speed and the vehicle speed through communication involving a communication function (e.g., CAN) of communicating with a smart unit and an engine control unit. The time measurement unit 117 is formed of a time measurement device that counts time by use of a real time clock or the like; even when the power source of the maintenance notification apparatus 110 is off, the real time clock constantly counts time so as to measure time.

The maintenance notification apparatus 110, configured in such a manner as described above, according to Embodiment 1 is an apparatus for supporting maintenance by a user in such a way that the control unit 114 calculates a maintenance timing based on information obtained from the vehicle information I/F 111 and information stored in the memory unit 115, that the user is notified of the maintenance timing by use of the display unit 113, and that the user is also notified of a maintenance method.

Figure 2:
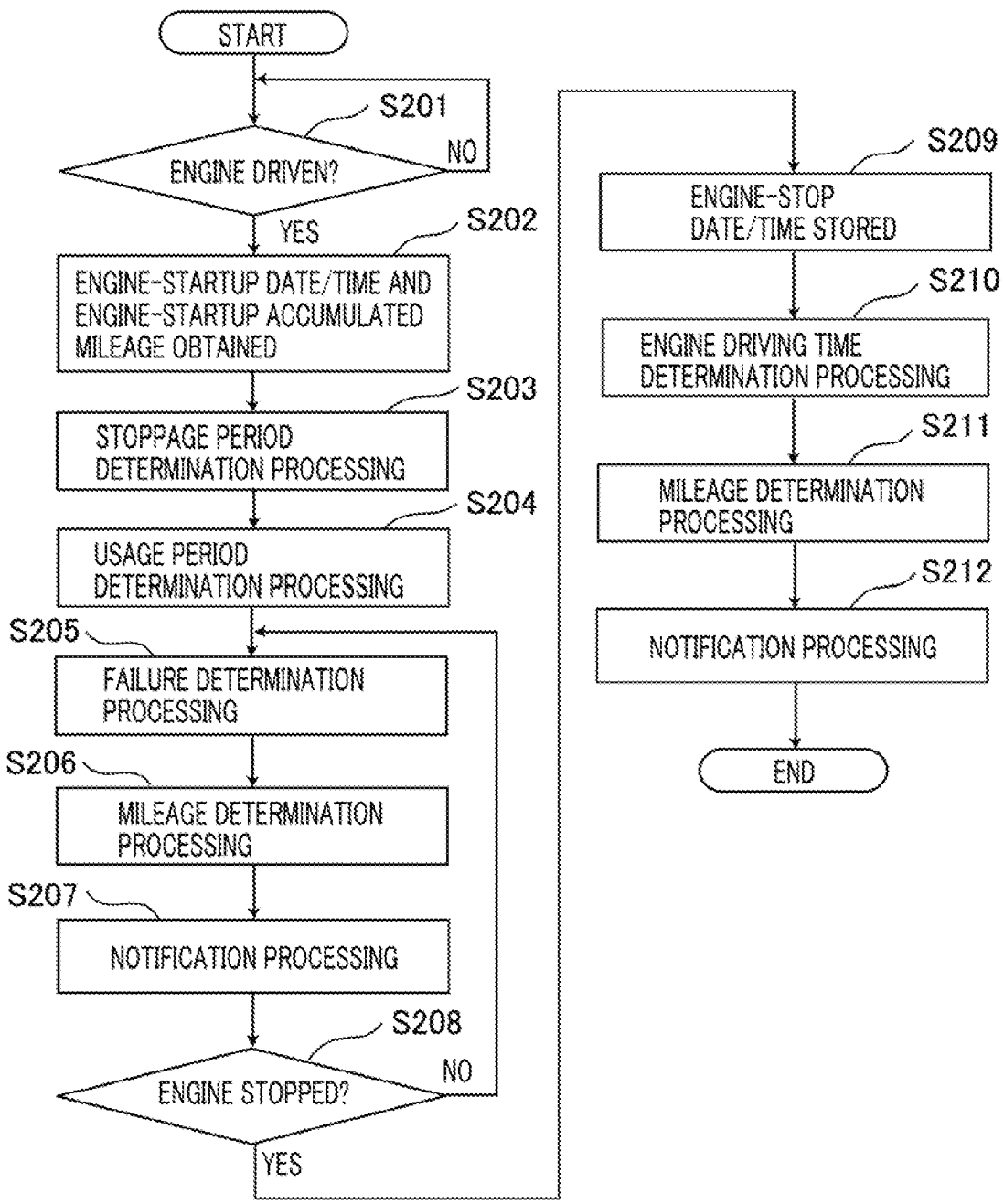
FIG. 2 is an overall flowchart of the maintenance notification apparatus according to Embodiment 1 of the present invention.

FIG. 2 is a chart representing the overall flow of the maintenance notification apparatus 110 according to Embodiment 1.

In FIG. 2, at first, in the step S201, it is determined whether or not the engine has been driven. In the case where the engine has been driven, the step S201 is followed by the step S202. In the case where the engine has not been driven, the step S201 will be repeated until the engine is driven.

In the step S202, the engine-start date and time is obtained from the time measurement unit 117, and the accumulated mileage of the vehicle is obtained from the vehicle information I/F 111 or the communication unit 116. The engine-start date and time is utilized for calculating a stoppage period in the step S203 and respective engine driving times for the vehicle parts in the step S210. The accumulated mileage is utilized for calculating respective mileage values for the vehicle parts in the step S206. The accumulated mileage may be stored in the maintenance notification apparatus 110. In that case, after it is determined in the step S208 that the engine has stopped, the accumulated mileage is stored in the memory unit 115.

Figure 3:
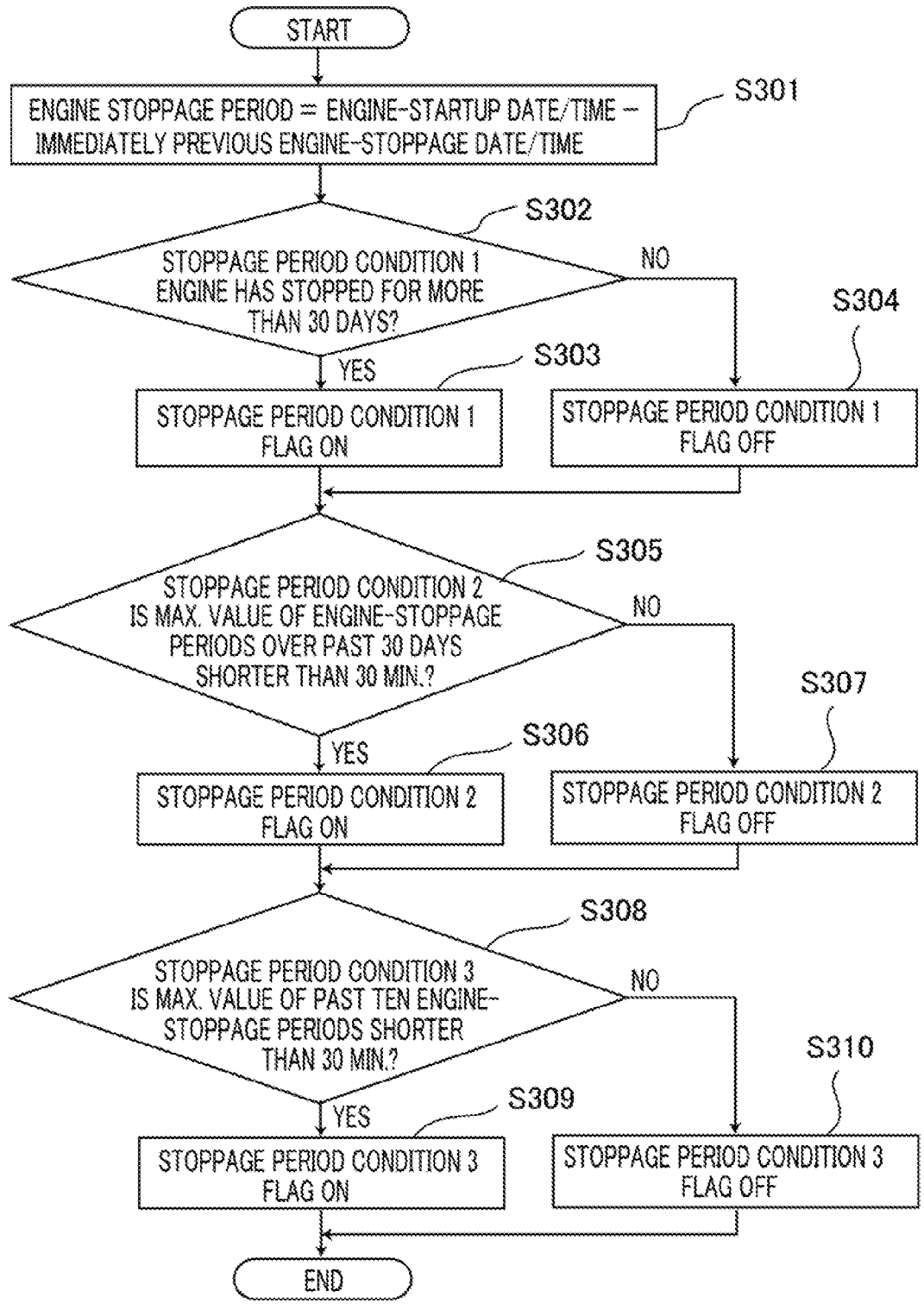
FIG. 3 is a flowchart of stoppage period determination processing by the maintenance notification apparatus according to Embodiment 1 of the present invention.

Next, in the step S203, engine stoppage period determination processing is implemented. FIG. 3 represents an example of stoppage period determination processing in the step S203.

In FIG. 3, an engine stoppage determination is calculated in the step S301. The engine stoppage period is calculated from the engine-start date and time obtained in the step S202 and the immediately previous engine-stop date and time (engine stoppage period=engine-start date and time−the immediately previous engine-stoppage date and time).

The memory unit 115 has stored the immediately previous engine-stoppage date and time in the step S209 when the engine stopped at the immediately previous time. The engine stoppage period that has been calculated in the step S301 is stored in the memory unit 115. When the engine stoppage period is stored in the memory unit 115, the engine stoppage period that was stored at the immediately previous time is stored as one-time-previous data; thirty engine stoppage periods including the newest one are stored in reverse chronological order.

In the step S302, a determination on the stoppage period condition 1 is performed. When the engine stoppage period calculated in the step S301 is the same as or longer than 30 days, the stoppage period condition 1 flag is set to ON in the step S303. In the case where in the step S302, the engine stoppage period is shorter than 30 days, the stoppage period condition 1 flag is set to OFF in the step S304.

Next, in the step S305, a determination on the stoppage period condition 2 is performed. In the case where the maximal value of the engine stoppage period within 30 days is shorter than 30 minutes, the stoppage period condition 2 flag is set to ON in the step S306. In the case where the maximum value of the engine stoppage period within 30 days is the same as or longer than 30 minutes, the stoppage period condition 2 flag is set to OFF in the step S307.

Moreover, in the step S308, a determination on the stoppage period condition 3 is performed. With regard to the stoppage period condition 3, in the case where the maximal value of 10 previous engine stoppage periods is shorter than 30 minutes, the stoppage period condition 3 flag is set to ON in the step S309. In the case where the maximal value of the 10 previous engine stoppage periods is the same as or longer than 30 minutes, the stoppage period condition 3 flag is set to OFF in the step S310.

It may be allowed that the initial condition is included, for example, in such a way that the determination on the stoppage period condition 2 is not implemented until 30 days elapses from the date of vehicle usage start or in such a way that the determination on the stoppage period condition 3 is not implemented until the vehicle has utilized 10 times.

Figure 4:
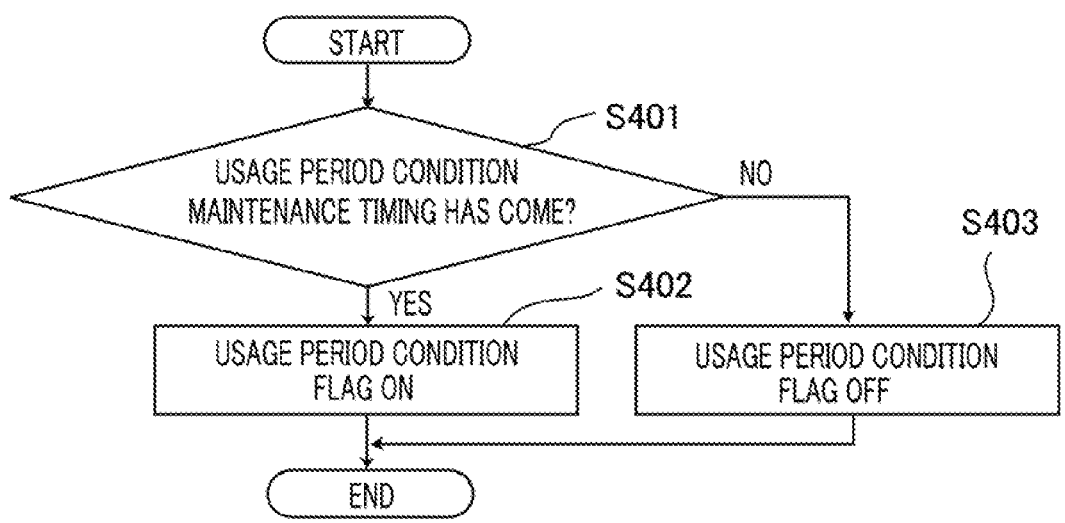
FIG. 4 is a flowchart of usage period determination processing by the maintenance notification apparatus according to Embodiment 1 of the present invention.

In FIG. 2, again, usage period determination processing is implemented in the step S204. FIG. 4 represents an example of the usage period determination processing in the step S204.

In FIG. 4, it is determined in the step S401 whether or not a maintenance timing has arrived. This determination is made by comparing the present date and time obtained from the time measurement unit 117 with the maintenance timing obtained from the memory unit 115. In the case where the maintenance timing has arrived, a usage period condition flag is set to ON in the step S402. In the case where the maintenance timing has not arrived, the usage period condition flag is set to OFF in the step S403. Processing for replacement timing is implemented in the same manner as the processing for the maintenance timing is implemented.

FIG. 5 represents an example of respective maintenance information items, for the vehicle parts, that are stored in the memory unit 115. As represented in the cells for maintenance dates and vehicle parts replacement dates in FIG. 5, maintenance dates and vehicle parts replacement dates are stored based on the respective usage-start dates of the vehicle parts. The maintenance date and the replacement date differ depending on the vehicle parts. Depending on the vehicle parts, the maintenance timing includes only a maintenance date, only maintenance mileage, or both a maintenance date and maintenance mileage. In the case where there exists no data, all the data pieces are set to "1" or the like.

In FIG. 2, again, failure determination processing is implemented in the step S205. In the failure determination processing, communication with an engine control unit and the like is performed through the CAN communication by the communication unit 116, so that not only a failure determination on the maintenance notification apparatus 110 itself is performed, but also failure information on the overall vehicle is determined. For example, in the case of an engine control unit, information on an abnormality in a sensor for OBD (On-Board Diagnostics) or an actuator is obtained through CAN communication so that the failure determination processing is performed. It may also be allowed that defectiveness in the maintenance is detected by various kinds of sensors and the user is warned of the defectiveness.

Figure 6:
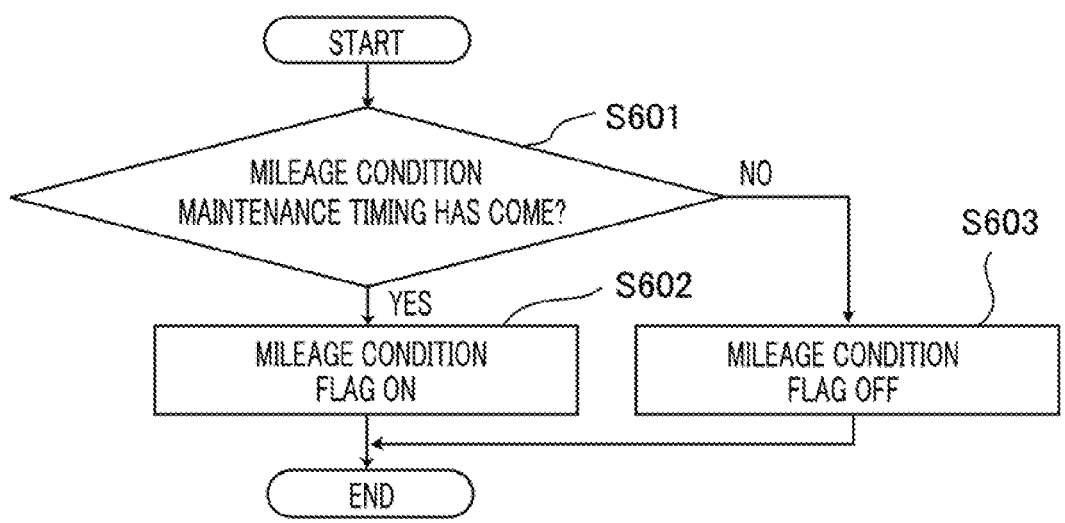
FIG. 6 is a flowchart of mileage determination processing by the maintenance notification apparatus according to Embodiment 1 of the present invention.

In the step S206, mileage determination processing is implemented. In the mileage determination processing, based on the respective mileage values, for the vehicle parts registered in the memory unit 115, that work as the standards for maintenance notification, it is determined whether or not the maintenance timing has arrived. FIG. 6 represents the mileage determination processing in the step S206. For example, as represented in FIG. 5, the respective mileage values, for vehicle parts, that work as standards of maintenance and replacement and the respective actual-usage mileage of the vehicle parts are registered in the memory unit 115. Then, in the step S601, it is determined whether or not the mileage condition indicates a maintenance timing. It is ascertained for each of the vehicle parts whether or not the vehicle mileage has exceeded the maintenance mileage. In the case where the vehicle mileage has exceeded the maintenance mileage, a mileage condition flag is set to ON in the step S602. In the case where the vehicle mileage has not exceeded the maintenance mileage, the mileage condition flag is set to OFF in the step S603.

Figure 7:
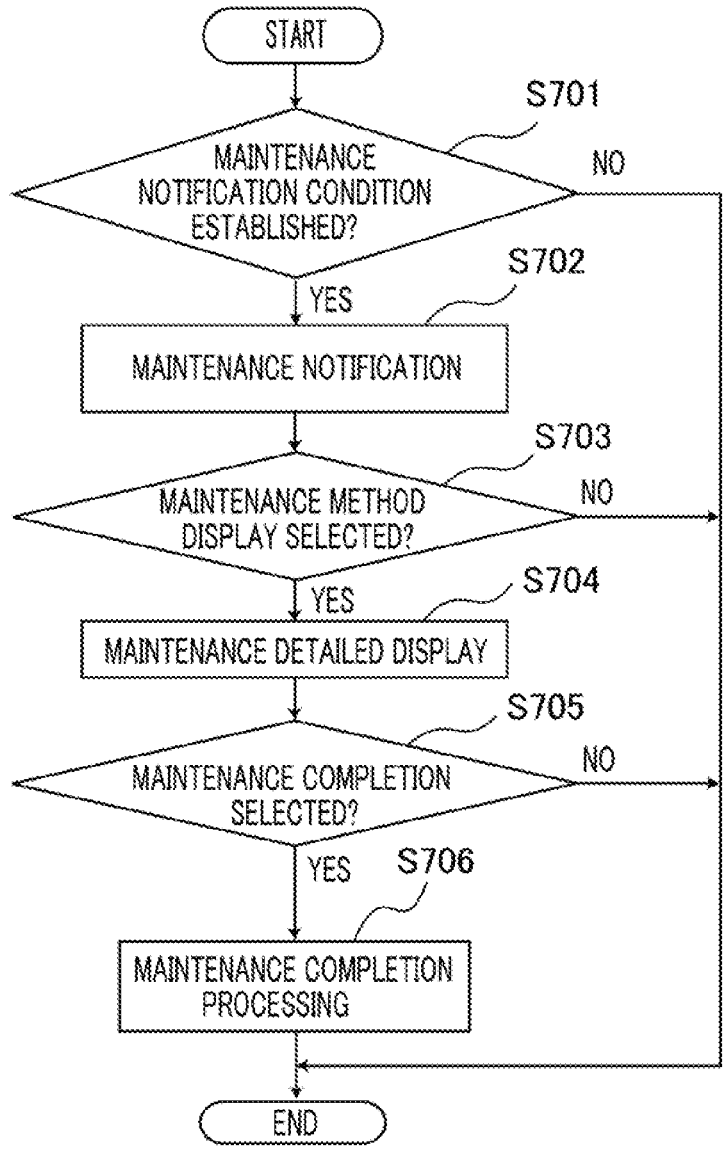
FIG. 7 is a flowchart of maintenance notification processing by the maintenance notification apparatus according to Embodiment 1 of the present invention.

Next, in the step S207, notification processing is implemented. In the notification processing, by use of the result of the determination implemented in the steps S203 through S206, it is determined whether or not notification should be provided to the user, and in the case where the notification is necessary, the notification is provided to the user. FIG. 7 represents an example of the notification processing.

In FIG. 7, it is determined in the step S701 whether or not a maintenance notification condition has been established. Based on the flags set in the steps S203 through S206, the determination is performed. In the case where when the stoppage period condition 1 flag, the stoppage period condition 2 flag, and the stoppage period condition 3 flag in the stoppage period determination processing of the step S203, the usage period condition flag in the usage period determination processing of the step S204, the failure flag in the failure determination processing of the step S205, the mileage condition flag in the mileage determination processing of the step S206 are referred to, the flags have been set to ON, it is suggested that the maintenance notification condition has been established and hence maintenance notification is performed in the step S702.

In the maintenance notification in the step S702, the user is notified of the fact that the present time is a maintenance timing or a vehicle parts replacement timing. In order to provide notification to the user, the fact that maintenance is required is displayed on the display unit 113. For the sake of the user's clear understanding, the display is performed in a pop-up manner.

After the maintenance notification is performed in a pop-up manner in the step S702, it is ascertained in the step S703 whether or not the user desires a maintenance method to be displayed. In the case where the user desires to confirm the maintenance method or to perform maintenance, the user selects the display of the maintenance method. When the user selects the display of the maintenance method, the detail of the maintenance method is displayed in the step S704.

The respective detailed maintenance methods for the vehicle parts are preliminarily stored in the memory unit 115, and the maintenance information on a vehicle part that requires maintenance is displayed. In this situation, in the case where the maintenance notification is performed based on a failure determination, it may be allowed that the maintenance method is changed in accordance with information from the vehicle information I/F 111. For example, in the case of a water-cooled engine, the method of dealing with the maintenance notification due to an abnormality in the engine coolant temperature differs depending on the cause of the abnormality. When an abnormality in the engine coolant temperature and another abnormality in the cooling system are concurrently detected, the vehicle is stopped because overheating may be caused; then, furthermore, in order to stop the cooling system, the dealing method of stoppage the engine is displayed. In contrast, when an abnormality exists in the engine coolant temperature but no abnormality exists in the cooling system, the vehicle is stopped because overheating may be caused; however, in order to cool the engine by the cooling system, a dealing method in which the engine is not stopped is displayed.

After the detailed maintenance method is displayed in the step S704, it is ascertained in the step S705 whether or not the maintenance has been completed. In the display unit 113, it is ascertained with the user whether or not the maintenance has been completed; when the user selects the completion of the maintenance, maintenance completion processing is performed in the step S706. In the maintenance completion processing, the respective maintenance dates of the vehicle parts for which maintenance has been completed are stored in the memory unit 115. With regard to the vehicle parts for which maintenance has been completed, the replacement dates, the mileage values, and the like are provided, as a maintenance history, for the user' reading.

In the case of maintenance notification through the usage period determination processing in the step S204 and the mileage determination processing in the step S206, the maintenance date and the maintenance mileage in FIG. 5 are updated. In the case where vehicle parts replacement was notified and then the vehicle parts replacement has been implemented, the present vehicle mileage and the present date are stored as the starting mileage and the starting date, respectively, in FIG. 5. Moreover, the maintenance mileage, the maintenance date, the replacement mileage, and the replacement date are also updated. Maintenance date updating data may preliminarily be stored in the memory unit 115 and then be utilized so that the maintenance mileage, the maintenance date, the replacement mileage, and the replacement date can be updated at a time of vehicle parts replacement; alternatively, the maintenance mileage, the maintenance date, the replacement mileage, and the replacement date may be calculated from the immediately previous list.

For example, in the case where when the maintenance date updating data is stored in the memory unit 115, the maintenance date of the engine oil is updated, the maintenance mileage and the maintenance period, which are maintenance date updating data items, are registered, for example, as 4000 km and 4 months, respectively; assuming that the vehicle mileage and the date at the time of vehicle parts replacement are 18200 km and 2015 Dec. 10, respectively, 22200 km, obtained by adding 4000 km to 18200 km, is registered as the maintenance mileage, and 2016 Apr. 10, which is 4 months after 2015-12-10, is registered as the maintenance date.

The vehicle parts replacement date is also registered in the same manner. In the case where the maintenance date updating data is not stored in the memory unit 115 but the data items in the FIG. 5 is stored, the maintenance timing can be updated by calculating the difference between the actual mileage and the maintenance mileage and the difference between the actual starting date and the maintenance date.

When the maintenance notification condition has not been established in the step S701, when because the user does not immediately perform maintenance, the user selects in the step S703 the option of not displaying any maintenance method, or when because the user does not immediately perform maintenance, the user ascertains the maintenance method but selects the non-completion of maintenance, the notification processing is immediately ended.

In the explanation made with reference to FIG. 7, there has been made description about maintenance; however, as described above, the same processing is performed also when vehicle parts are replaced.

In FIG. 2 again, after the notification processing in the step S207 has been completed, it is determined in the step S208 whether or not the engine has stopped. In the case where the engine has stopped, the date when the engine has stopped is stored in the step S209. In the case where the engine has not stopped, the failure determination in the step S205 is resumed; in the step S205, the failure determination processing, the mileage determination processing, and the notification processing are repeated.

The engine stoppage date and time in the step S209 are stored in order to perform a stoppage period condition determination in the step S203. The engine stoppage date and time, which have been stored in the memory unit 115, are utilized, as the immediately previous engine stoppage date and time in the step S301, when the engine is started next time. As a result, the engine stoppage period can be calculated. FIG. 8 represents an example of list related to the engine stoppage period. In this example, the latest 30 engine stoppage periods are stored and utilized in the stoppage period condition determination. The list, out of which the stoppage period and the stoppage date and time are utilized, is applied to stoppage period condition determination processing in the step S203.

Figure 9:
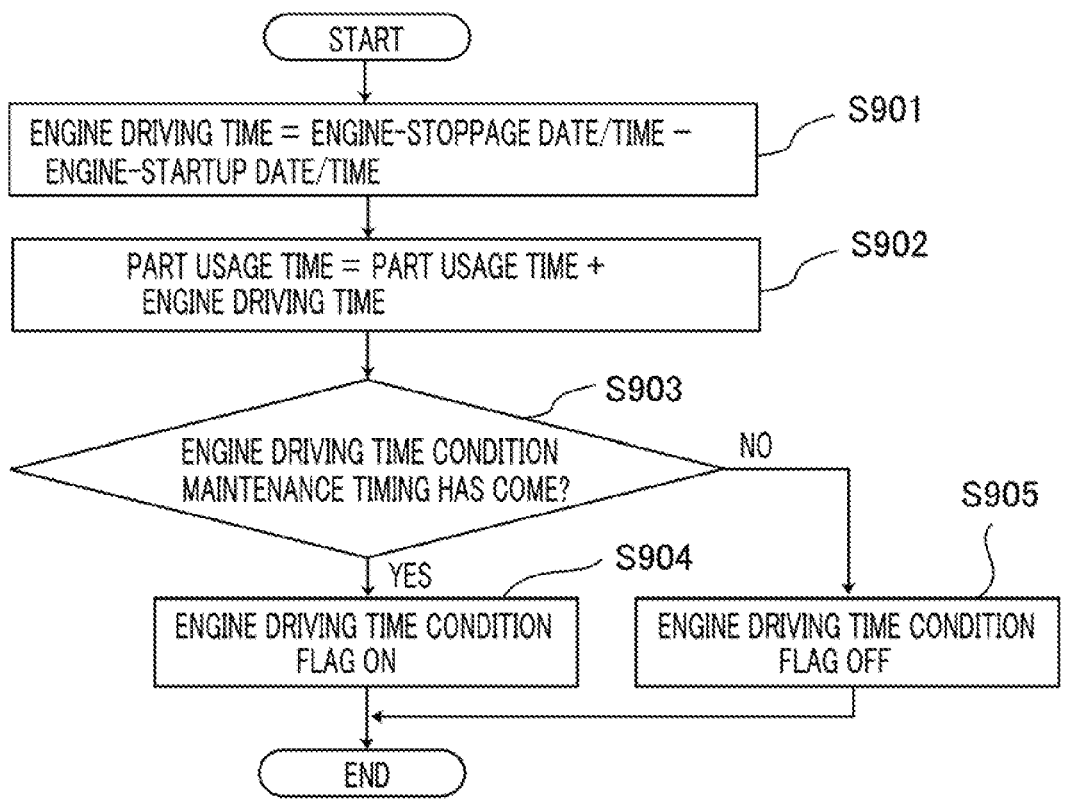
FIG. 9 is a flowchart of engine driving time determination processing by the maintenance notification apparatus according to an example of the present invention.

In the step S210, engine driving time determination processing is implemented. In the step S210, the time during which the engine has been driven is calculated, and then, a maintenance notification determination is performed. FIG. 9 represents an example of the engine driving time determination processing in the step S210.

In FIG. 9, an engine driving time is calculated in the step S901.

The time during which the engine has been driven is calculated by subtracting the engine-start date and time in the step S202 from the engine-stop date and time in the step S209. In the step S902, the usage time of each of the vehicle parts and the engine driving time obtained in the step S901 are added and then the usage time of each of the vehicle parts is updated with the usage time obtained through the addition. The usage time of each of the vehicle parts starts with "0" hour when the vehicle part is brand-new; the engine driving time is added thereto through the processing in the step S210. When a vehicle part is replaced, the usage time of the vehicle part is reset to "0" hour; then, the engine driving time is added thereto again in accordance with the usage time.

In the step S903, it is determined, based on the engine driving time condition, whether or not the maintenance timing of the vehicle part has arrived; in the case where the maintenance timing has arrived, an engine driving time condition flag is set to ON in the step S904. When it is determined, based on the engine driving time condition, that the maintenance timing of the vehicle part has not arrived, the engine driving time condition flag is set to OFF in the step S905.

Data similar to that in FIG. 5 is utilized also in an engine driving time determination. The usage time of each of the vehicle parts calculated in the step S902, the maintenance time (when the usage time exceeds this time, maintenance notification is implemented), the replacement time (when the usage time exceeds this time, notification of the vehicle parts replacement is implemented) are stored as data, so that the engine driving time determination can be performed.

In the step S211, the mileage condition determination, the same as that in the step S206, is performed. After the engine has stopped, the mileage determination processing is performed in order to ascertain whether or not maintenance is required, based on the mileage accumulated till that stoppage of the engine.

The notification processing, the same as that in the step S207, is performed again in the step S212. In the step S212, the results of the determinations in the steps S210 and S211 are ascertained and then notification is performed. That is to say, the engine driving time condition flag in the determination in the step S210 and the mileage condition flag in the determination in the step S211 are referred to; in the case where the flags are ON, maintenance notification is performed.

Embodiment 1 has been described in detail heretofore; next, an embodiment that is different from Embodiment 1 will be explained.

The maintenance notification apparatus 110 may be realized either as part of a navigation-system function or as part of a meter function.

Vehicle information to be inputted through the vehicle information I/F 111 may be received through communication with another unit, by use of the communication unit 116. In contrast, information such as a vehicle speed to be obtained through communication may be received by way of the vehicle information I/F 111.

Although it has been described that the time measurement unit 117 is formed of, for example, a real time clock, any other devices can be utilized as long as it can measure a time; thus, it may be allowed that a time instant may be obtained through not a real time clock but a GPS device or a smartphone and then the processing is performed.

Because in the failure determination processing of the step S205 in FIG. 2, a failure is determined through a determination for a time of several milliseconds to several seconds and is immediately notified to the user, the calculation is performed in a short period such as 5 ms or 10 ms, in general; however, because in the mileage determination processing in the step S206, no dangerous situation takes place in a short time, in comparison with the failure determination processing, it may be allowed that the calculation is performed every 100 km or 1000 km of mileage or that the calculation is performed only once at a time when the engine is started or is stopped. After the engine has stopped, the user may not readily be aware of the notification; thus, for example, it may be allowed that notification is implemented in such a way that in the case of an automobile, the calculation for the mileage determination processing is performed at a time when the shift is set to "Parking" and in such a way that in the case of a motorcycle, the stoppage thereof is determined and then the calculation is performed at a time when the side stand is erected.

In the example represented in FIG. 2, the mileage determination processing in each of the steps S206 and S211 and the engine driving time determination processing in the step S210 have been described; however, because the engine driving time is equivalent to the mileage and is utilized for ascertaining usage deterioration, only any one of the mileage determination processing and the engine driving time determination processing may be performed.

In the flowchart represented in FIG. 3, three stoppage period conditions are described; however, the present invention is not limited to these three conditions. It may be allowed that there exists no stoppage period condition or that there exists four stoppage period conditions. Moreover, the numbers of days and times in the condition may arbitrarily be set.

With regard to the maintenance date, the maintenance mileage, the vehicle parts replacement date, and the vehicle parts replacement mileage in FIG. 5, the recommendation value for each of the vehicle parts is preliminarily set, as the initial value; however, it may be allowed that the user can change the maintenance interval.

In the example represented in FIG. 5, the vehicle accumulated distance (starting mileage) at a time when the usage of a vehicle part starts, the accumulated mileage (maintenance mileage) as the standard for a maintenance timing, and the date (maintenance date) as the standard for a maintenance timing are stored; however, relative data may be stored. FIG. 10 represents an example therefor. In FIG. 10, the accumulated distance of a vehicle in which the usage of a vehicle part has been utilized, the accumulated mileage as a maintenance standard or a replacement timing, and the date as a maintenance standard or a replacement timing in FIG. 5 are replaced by the usage mileage of the vehicle part itself, the maintenance mileage of the vehicle part itself, and the number of days (the maintenance interval, the vehicle parts replacement interval) that elapsed from the date when the usage of the vehicle part has started.

With regard to the notification processing in each of the steps S207 and S212, the display unit 113 is utilized in order to notify the user of the fact that the maintenance timing has arrived; however, it may be allowed that not only the display unit 113 but also the vehicle information I/F 111 or the multimedia I/F 112 is utilized. In the case of the vehicle information I/F 111, an indicator lamp, for example, may be utilized. In the case of the multimedia I/F 112, for example, it may be allowed that the maintenance notification apparatus transmits date to a smartphone so that various kinds of data items of the maintenance notification apparatus can be ascertained with the smartphone. The fact that the maintenance timing has arrived may be notified to the user by means of the sound of a buzzer or the like.

Moreover, it may be allowed that when maintenance is performed, related manuals can be read. Furthermore, because a user sometimes becomes aware of a minor abnormality in the vehicle, which is not easily detected by a sensor, as feeling of discomfort during a drive, it may be allowed that there is provided a reverse-lookup function in which based on the user's feeling of discomfort, the user is notified of the portion that might have caused the defect. A phenomenon, the contents that might be the cause thereof, and the maintenance method therefor are preliminarily stored in the memory unit 115 so that the user can understand what portion should be checked. For example, as represented in FIG. 11, the check item and the check method for each phenomenon are preliminarily stored. In the case where a phenomenon "a motorcycle does not run straightly" occurs, "the air pressure of a tire", "abrasion of a tire", "distortion of the front fork", "consumption or abrasion of a stem bearing" are conceivable, as the cause thereof; thus, the check method and the maintenance method are preliminarily stored. A link is provided so that reference materials related to the check method can be ascertained. In some cases, even when a user has feeling of discomfort, he cannot understand the cause thereof. The feeling of discomfort may be caused by an abnormality (inadequate maintenance or the like) in the motorcycle; thus early detection can prolong the lifetime of the vehicle and can prevent an accident.

Moreover, the maintenance method may be changed in accordance with the season or the atmospheric temperature. That is, for example, because the viscosity of engine oil changes in accordance with the atmospheric temperature and because the performance of a battery is susceptible to the atmospheric temperature.

In the case where the maintenance method is changed in accordance with the atmospheric temperature, the area position information on the vehicle storage place and the average monthly atmospheric temperature through a year are preliminarily registered. Registration of the foregoing items may be performed either manually or through the multimedia I/F 112.

Figure 12:
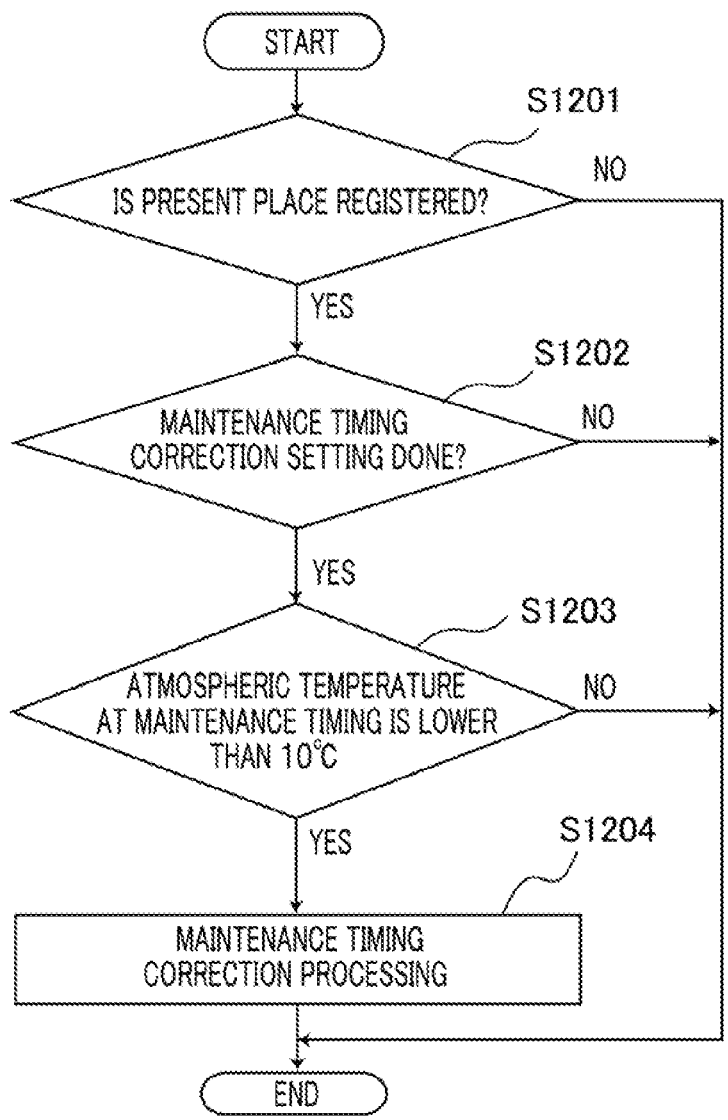
FIG. 12 is a flowchart of maintenance timing correction processing by the maintenance notification apparatus according to Embodiment 1 of the present invention.

FIG. 12 represents the flow at a time when the maintenance timing is changed in accordance with the atmospheric temperature.

In FIG. 12, it is determined in the step S1201 whether or not the present place is a registered area. The information on the present place is obtained through a GPS device or the like. In the case where the present place is a registered area, it is determined in the step S1202 whether or not a maintenance timing correction has been set. The user's preliminary determination on whether or not the maintenance timing correction should be implemented results in the foregoing setting. In the case where it is determined in the step S1202 that the maintenance timing correction has been set, the atmospheric temperature of the month corresponding to the maintenance timing of the vehicle part is checked in the step S1203. In the case where in the step S1203, the atmospheric temperature of the month corresponding to the maintenance timing is lower than 10° C., the maintenance timing correction processing is performed in the step S1204. In the maintenance timing correction processing, the maintenance timing is advanced by one month.

In the case where when the vehicle is in an area that has not been registered, the maintenance timing is corrected, the correction becomes inappropriate; thus, in the case where in the step S1201, the present place is not a registered area, the processing is ended. When the user has selected the setting of not performing the maintenance timing correction, the processing is ended in the step S1202. In the case where in the step S1203, the atmospheric temperature is the same as or higher than 10° C., the maintenance timing correction is not performed.

In the case where when the vehicle part that is subject to the maintenance timing correction is a battery, the atmospheric temperature of the month at the maintenance notification timing is low, the performance of the battery is lowered due to deterioration in the battery and the effect of the atmospheric temperature, which provides a negative effect to the startup of the engine. Accordingly, the maintenance notification timing is advanced by one month; as a result, the notification timing is corrected so that the performance can be ascertained and that vehicle parts can be replaced. Based on the position information obtained through the GPS, it is ascertained whether or not the present vehicle place coincides with the registered area position information, so that mismatching between the registration and the maintenance notification timing correction can be prevented.

With regard to the maintenance timing correction processing, the implementation condition and the advancement period of the maintenance timing correction processing do not limit examples of the description. With regard to the maintenance timing correction processing, it may be allowed, for example, that monthly average atmospheric temperatures are ascertained in an anti-chronological direction from the initial maintenance timing and a month having the average atmospheric temperature of 10° C. or higher is set to the new maintenance timing.

As represented in the step S704 of FIG. 7, the contents of the maintenance method for each of the processing items may be changed based on information such as a sensor value obtained through the vehicle information I/F 111. For example, in the case of the stoppage period determination processing in the step S203 of FIG. 2, it is made possible to perform notification for urging the user to charge the battery or to drive the engine for a time enough to charge the battery, based on the result of the stoppage period determination and the battery voltage value at a time before the engine is driven. In addition, in the maintenance for a tire, the air pressure may be ascertained; however, in the case where a sensor for monitoring the tire air pressure is provided and the control unit 114 can make sure that the air pressure is normal, it is made possible to omit the maintenance notification for the air pressure or to reduce the frequency of the notification.

Furthermore, with regard to each of the steps S207 and S212, another example will be explained. In the foregoing example, even when the vehicle is traveling, maintenance notification is performed. However, in some cases, the pop-up display during a drive bothers the driver; thus, in FIG. 13, there will be represented an example in which based on vehicle information from the vehicle information I/F 111, the communication unit 116, or the like, it is determined whether or not the vehicle is traveling and only in the case where the vehicle is not traveling, the pop-up display is performed. In FIG. 7, maintenance notification through pop-up display is continued until the maintenance is completed. The vehicle may be kept utilized without undergoing maintenance or the user may be bothered by the continuous maintenance notification; thus, provision is made for making it possible that after the pop-up display appears, the user selects whether or not the pop-up display should be continued.

Figure 13:
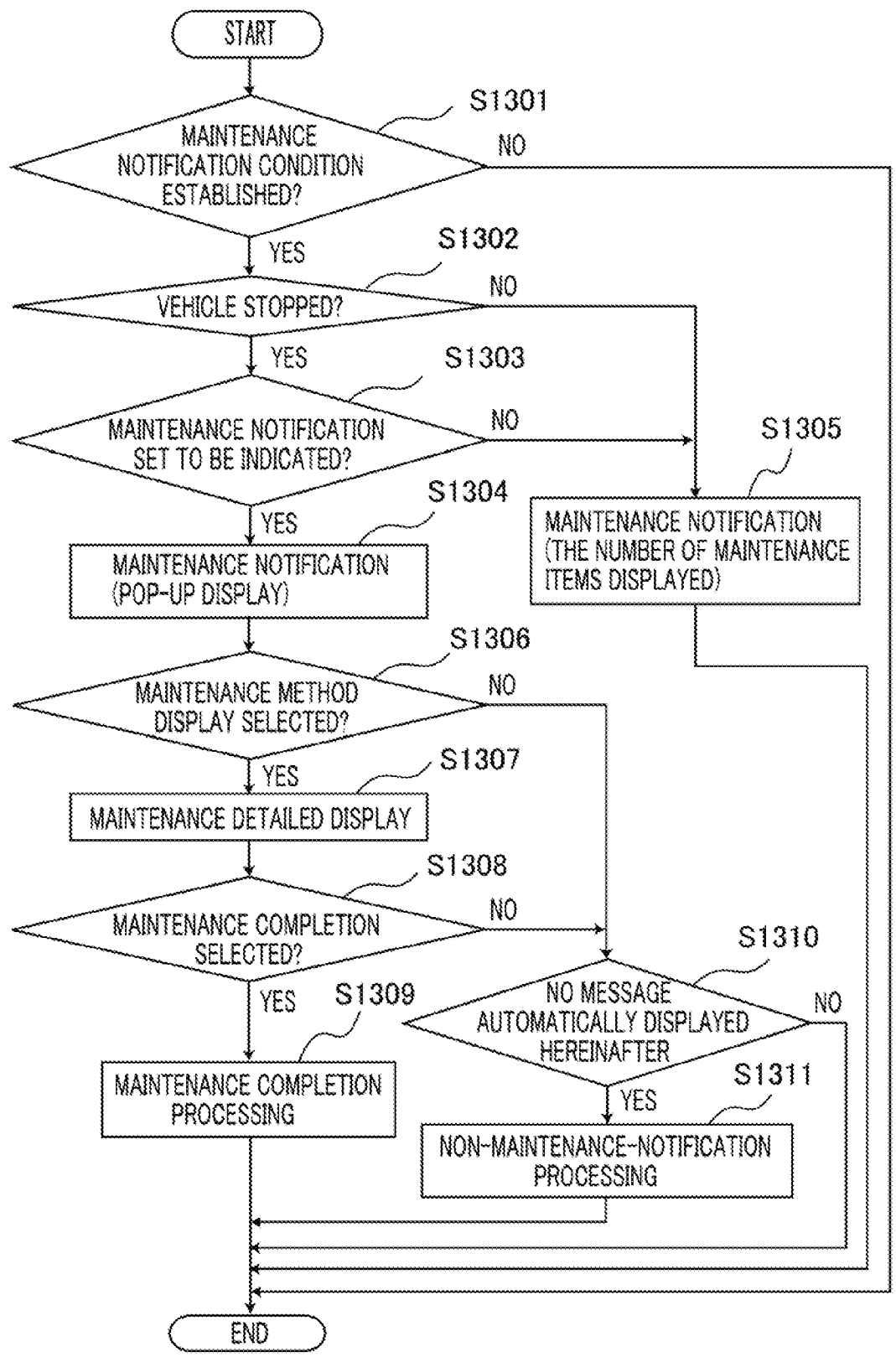
FIG. 13 is a flowchart of maintenance notification processing by the maintenance notification apparatus according to Embodiment 1 of the present invention.

In FIG. 13, it is determined in the step S1301 whether or not a maintenance notification condition has been established (in the same manner as in the step S701). In the case where the maintenance notification condition has been established, it is ascertained in the step S1302 whether or not the vehicle has been stopped. The determination whether or not the vehicle has been stopped is made based on the vehicle speed, the state of the side stand, the state of the shift, or the like.

In the case where the vehicle has been stopped, it is ascertained in the step S1303 whether or not the option that maintenance notification is provided has been selected. Setting for the option whether or not the maintenance notification is provided can be selected by the user in the step S1310. In the case where the setting for the option that the maintenance notification is provided has been made, the maintenance notification is performed in a pop-up manner in the step S1304 (in the same manner as in the step S702).

In each of the case where in the step S1302, the vehicle is traveling and the case where in the step S1303, the setting for the option that the maintenance notification is not provided has been selected, the pop-up maintenance notification is not performed and the display is limited in such a way that only the mark for maintenance notification and the number of maintenance notification instances are displayed in the step S1305.

In the case where the pop-up display is performed in the step S1304, it is then ascertained with the user in the step S1306 whether or not the maintenance method should be displayed. In the case where the maintenance method is displayed in the step S1306, the details of the maintenance are displayed in the step S1307 (in the same manner as in the step S704). After the details of the maintenance have been displayed in the step S1307, it is ascertained with the user in the step S1308 whether or not the maintenance has been completed.

When the user selects the completion of the maintenance, the maintenance completion processing is performed in the step S1309 (in the same manner as in the step S706). In each of the case where in the step S1306, the user selects the option that the maintenance method is not displayed and the case where in the step S1308, the user selects the non-completion of the maintenance, it is ascertained with the user in the step S1310 whether or not a message (pop-up display) should automatically be displayed hereinafter. In the case where the user selects the option that the message is not automatically displayed, setting is made in the step S1311 in such a way that the automatic pop-up maintenance notification is not performed hereinafter.

In the step S1303, it is determined whether or not notification is performed, after referring to the setting in the step S1311. The initial value is set for the option that maintenance notification is provided. Provision is made that even in the case where setting is made for the option that maintenance notification is not automatically performed, the user can ascertain the vehicle parts that need to undergo maintenance, based on a maintenance list or the like. Alternatively, it may be allowed that user can constantly ascertain whether or not maintenance is required, in such a way that instead of the pop-up display, a maintenance lamp is provided and lit for the sake of easy understanding that there exists a vehicle part that needs to undergo maintenance or in such a way that the display unit 113 displays a mark indicating that there exists a vehicle part that needs to undergo maintenance. Moreover, it may be allowed that the number of vehicle parts that need to undergo maintenance is concurrently displayed. In the case where in the step S1310, the use selects the option that the message is automatically displayed, pop-up display is performed continuously at the timing of maintenance notification.

In the case where the maintenance notification condition is established while the vehicle is traveling, pop-up display is not performed due to the determination in the step S1302; however, because the option, in the step S1310, that no maintenance notification is performed is not selected, the pop-up display is performed when the vehicle stops. It has been described that the initial value is set for the option that maintenance notification is provided; however, provision may be made that before maintenance notification is performed, it can be set whether or not pop-up display is performed for each of the vehicle parts at a time when maintenance notification is implemented.

Figure 14:
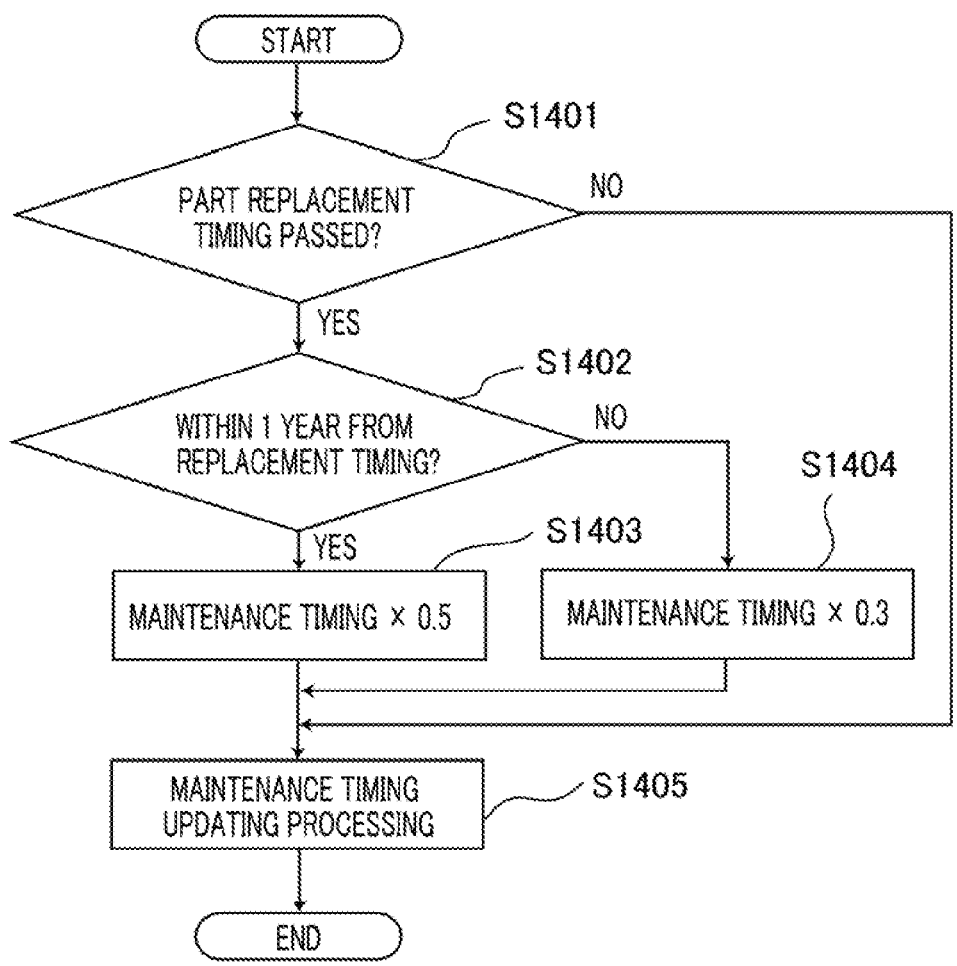
FIG. 14 is a flowchart of maintenance timing updating processing by the maintenance notification apparatus according to Embodiment 1 of the present invention.

Next, FIG. 14 represents the maintenance completion processing in each of the step S706 of FIG. 7 and the step S1309 of FIG. 13. In each of the step S706 of FIG. 7 and the step S1309 of FIG. 13, there are performed processing in which after the completion of maintenance, the maintenance timing is updated and then the updated timing is stored in the memory unit 115 and processing in which the maintenance history is stored. FIG. 14 represents processing in which in the case where in the maintenance completion processing, the vehicle parts replacement date has already passed, the maintenance timing is shortened in comparison with the normal period. In the case where when in response to maintenance notification (vehicle parts replacement notification), the condition of the vehicle part is ascertained and then the usage of the vehicle part is continued because the condition thereof is sufficient, there is performed this processing in which the maintenance timing is shortened in comparison with the normal period.

In the step S1401, it is ascertained whether or not the vehicle parts replacement date has passed. In the case where the vehicle parts replacement date has passed, the maintenance timing is shortened in comparison with the normal period, through the processing steps after and including the step S1402. In the step S1402, it is determined whether or not the present time is within one year from the previous replacement date. In the case where the present time is within one year from the previous replacement date, the maintenance timing (the mileage or the period between the usage start and the maintenance date) is multiplied by 0.5 in the step S1403 so that the period till the next maintenance is made shorter than the setting value that has been effective until the present vehicle parts replacement date.

In the case where the engine oil in FIG. 5 is taken into consideration, the period between the usage-start date of the engine oil and the maintenance date is 4 months; thus, the next maintenance period is set to 2 months in the processing of the step S1403. The mileage is dealt with in the same manner as described above, i.e., because the distance between the usage-start mileage of the engine oil between the maintenance mileage is 4000 km, the maintenance mileage is multiplied by 0.5 and then the maintenance mileage is set to 2000 km. In the case where in the step S1402, one year has passed from the replacement timing, the new maintenance timing is set, in the step S1404, to a value obtained by multiplying the maintenance timing at a timing before the vehicle parts replacement date by 0.3.

After the calculation of the maintenance timing has been completed in the steps S1403 and S1404, the maintenance timing is stored in the memory unit 115 in the step S1405. In the case where in the step S1401, the vehicle parts replacement date has not passed, the maintenance timing is updated with the setting for the normal maintenance timing and is stored in the memory unit 115 in the step S1405.

In the steps S1402 through S1405, it is determined to what extent the maintenance timing is shortened in accordance with the years that have elapsed from the replacement timing; however, the years that have elapsed from the replacement timing and the number of determination conditions in the step S1402 and the respective coefficients by which the maintenance timings are multiplied in the steps S1403 and S1404 are not limited thereto. In the case where the vehicle parts replacement date has passed, it may be allowed that regardless of the period at a time before the replacement date passes, the maintenance timing is set. When the maintenance interval is too short, the user may feel bothered and hence he may neglect the maintenance; thus, it may be allowed that there is provided processing for clipping the maintenance interval with a lower limit value. In contrast, when the maintenance interval is too long, a safety problem is posed; thus, it may be allowed to clip the maintenance interval with an upper limit value; alternatively, in the case where a vehicle part has been being utilized for a long time after the vehicle parts replacement date passed, it may be allowed to perform maintenance notification regardless of the setting value of the maintenance interval.

With regard to a vehicle part that has been used for a long period, it may be allowed that in the case where a certain number of years have passed, there is applied the processing, as represented in FIG. 14, for resetting the maintenance period to a shorter one even when the vehicle parts replacement date has not passed.

In the case where in each of the steps S703, S705, and the like in which the user performs selection, the user does not perform selection for more than a predetermined time, a timeout occurs and then the processing is ended. When a timeout occurs, the setting for the option that no maintenance notification is provided has not been implemented; therefore, the maintenance notification is performed again at the next notification timing.

Past thirty engine stoppage periods are stored in the step S209; however, the present invention is not limited to this number. It may be allowed that a necessary number of past engine stoppage periods are stored in accordance with the stoppage period condition represented in FIG. 3.

It has been described that in the notification processing in the step S212, only the flags for the processing items in which determination is performed after the engine has stopped are ascertained; however, it may be allowed that all the condition flags are ascertained and then maintenance notification is provided to the user after the stoppage of the engine so that the user is urged to make the vehicle undergo maintenance.

As described in detail heretofore, the maintenance notification apparatus according to Embodiment 1 supports a user of a vehicle in maintenance of vehicle parts utilized in the vehicle; the maintenance notification apparatus includes the vehicle information I/F 111 that obtains vehicle information on a vehicle, the time measurement unit 117 that measures a present time, the memory unit 115 that stores maintenance information on the vehicle, the control unit 114 that calculates a maintenance timing based on vehicle information obtained by the vehicle information I/F 111, a present time measured by the time measurement unit 117, and maintenance information stored in the memory unit 115, and the display unit 113 that notifies the user of arrival of the maintenance timing and a maintenance method; the maintenance notification apparatus is characterized in that from the result of a failure determination based on the vehicle information, a stoppage period during which the vehicle stops, a usage period of the vehicle part between the usage-start time and the present time, and mileage of the vehicle or an engine driving time, the control unit 114 detects that the maintenance timing for the vehicle part has arrived, and in that based on detection by the control unit 114, the display unit 113 notifies the user of arrival of a maintenance timing and a maintenance method.

As a result, there are performed maintenance notification for deterioration due to usage, which relates to the mileage and the usage period, and deterioration due to disuse for a long time, and a maintenance method is also notified; therefore, prolongation of the lifetimes of the vehicle parts and the vehicle and prevention of an accident can be expected. Because maintenance notification is performed by use of vehicle information, an optimum maintenance method can be notified.

A maintenance notification apparatus according to Embodiment 1 is characterized in that a notification means is changed in accordance with the vehicle condition obtained through a sensor or communication; in particular, the maintenance notification apparatus according to Embodiment 1 is characterized in that while a vehicle travels, the notification means is restricted so that maintenance notification is performed without providing a negative effect to the drive of the vehicle.

As a result, for example, by providing a restriction on the notification means while a vehicle travels, the maintenance notification can be prevented from disturbing the drive.

A maintenance notification apparatus according to Embodiment 1 is characterized in that a maintenance notification timing is changed in accordance with the vehicle condition obtained through a sensor or communication; in particular, the maintenance notification apparatus is characterized in that a maintenance notification timing is corrected in accordance with the ambient environment such as the atmospheric temperature or the season so that an optimum maintenance notification is performed.

Accordingly, because notification for the vehicle can be performed at an optimum maintenance timing, the probability of a trouble can be lowered.

A maintenance notification apparatus according to Embodiment 1 is characterized in that even in the case of a maintenance method for a single and the same vehicle part, notification contents are changed in accordance with vehicle information. The maintenance notification apparatus is characterized in that because a maintenance method differs depending on the cause of a vehicle failure, the maintenance method (notification contents) is changed in accordance with the vehicle condition obtained through a sensor or communication.

Accordingly, more appropriate maintenance can be performed and hence optimum countermeasures can be taken.

A maintenance notification apparatus according to Embodiment 1 is characterized in that in the case where a vehicle part has been utilized for a period exceeding a replacement timing, a maintenance notification interval is made shorter than that at a time before the replacement timing has arrived.

As a result, prolongation of the lifetime of the vehicle part can be expected. In the case where even when a vehicle part is not so deteriorated as to be replaced, the recommended replace timing has arrived, the frequency of the maintenance is heightened so that the safety is secured.

A maintenance notification apparatus according to Embodiment 1 is characterized in that the maintenance notification interval is not constant but shortened in reverse proportion to usage years or usage mileage of the vehicle part.

Accordingly, the safety is secured. A vehicle part is more deteriorated in proportion to the usage years or the usage mileage; therefore, the frequency of maintenance is raised so that the safety is secured.

Various modifications and alterations of this invention will be apparent to those skilled in the art without departing from the scope and spirit of this invention, and it should be understood that this is not limited to the illustrative embodiments set forth herein.

What is claimed is:

1. A maintenance/replacement notification apparatus that supports a user of a vehicle in at least one of maintenance of a vehicle part utilized in the vehicle, or replacement of the vehicle part, the maintenance/replacement notification apparatus comprising:
    a clock that measures time;
    a memory that stores a usage start date of a vehicle part, a recommended maintenance or replacement date for the vehicle part based on the usage start date of the vehicle part, a starting mileage at the usage start date for the vehicle part, and a recommended maintenance or replacement mileage for the vehicle part based on the starting mileage at the usage start date for the vehicle part, for one or more vehicle parts;
    a display; and
    at least one processor configured to:
        when an engine of the vehicle is turned off, store, in the memory, information regarding a time that the engine is turned off;
        when the engine is turned on, store, in the memory, information regarding a time that the engine is turned on;
        perform maintenance or replacement notification determination processing, which includes:
            based on at least one of the recommended maintenance or replacement date of the vehicle part becoming equal to or after a current date indicated by the clock, or a current vehicle mileage, which is obtained as vehicle information from the vehicle, becoming greater than or equal to the recommended maintenance or replacement mileage for the vehicle part, determining that at least one of a maintenance or a replacement should be performed with regards to the vehicle part;
            calculating and storing, in the memory, a stoppage period, which is a period during which an engine of the vehicle is off, by subtracting the stored time when the engine was last turned off from the stored time when the engine was started; and
            based on the stored stoppage period being greater than or equal to a predetermined stoppage limit value, determining that at least one of a maintenance or a replacement should be performed with regards to the vehicle part; and
        based on a result of the maintenance or replacement notification determination processing, control the display to display a notification related to the arrival of a recommended maintenance or replacement timing for the vehicle part and information related to a corresponding maintenance or replacement method, wherein the calculating the stoppage period includes subtracting the stored time when the engine was last turned off from the stored time when the engine was started after being last turned off.

2. The maintenance notification apparatus according to claim 1, wherein the maintenance or replacement method is changed in accordance with at least one of: a season or an atmospheric temperature.

3. The maintenance notification apparatus according to claim 1, wherein in a case where the vehicle part has not been utilized for a period of time equal to or exceeding a replacement timing, a maintenance notification interval is made shorter than the maintenance notification interval at a time before the replacement timing has arrived.

4. The maintenance/replacement notification apparatus according to claim 1, wherein in reverse proportion to usage years or usage mileage of the vehicle part, the maintenance notification interval is shortened.

5. The maintenance/replacement notification apparatus according to claim 1, wherein the predetermined stoppage limit value corresponds to 30 days.

6. A maintenance/replacement notification apparatus that supports a user of a vehicle in at least one of maintenance of a vehicle part utilized in the vehicle, or replacement of the vehicle part, the maintenance/replacement notification apparatus comprising:
    a clock that measures time;
    a memory; and
    at least one processor configured to:
        when an engine of the vehicle is turned off, store, in the memory, information regarding a time that the engine is turned off;
        when the engine is turned on, store, in the memory, information regarding a time that the engine is turned on;
        calculate and store, in the memory, a stoppage period, which is a period during which an engine of the vehicle is off, by subtracting the stored time when the engine was last turned off from the stored time when the engine was started;
        based on the stored stoppage period being greater than or equal to a predetermined stoppage limit value, determine that at least one of a maintenance or a replacement should be performed with regards to the vehicle part; and
        based on determining that the at least one of the maintenance or the replacement should be performed, output a notification related to the arrival of a recommended maintenance or replacement timing for the vehicle part and information related to a corresponding maintenance or replacement method, wherein the calculating the stoppage period includes subtracting the stored time when the engine was last turned off from the stored time when the engine was started after being last turned off.

* * * * *